United States Patent
Leanza et al.

(10) Patent No.: US 8,439,143 B2
(45) Date of Patent: May 14, 2013

(54) OVER BULKHEAD AIR INTAKE SYSTEM

(75) Inventors: Anthony John Leanza, Powell, OH (US); Patrick M. Shafer, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 90 days.

(21) Appl. No.: 13/031,359

(22) Filed: Feb. 21, 2011

(65) Prior Publication Data
US 2012/0211293 A1    Aug. 23, 2012

(51) Int. Cl.
*B60K 13/02* (2006.01)
*B60K 13/06* (2006.01)
*F02M 35/10* (2006.01)
*F02M 35/16* (2006.01)

(52) U.S. Cl.
USPC ................... 180/68.3; 180/68.4; 123/198 E (58) Field of Classification Search ................ 180/68.1, 180/68.2, 68.3, 68.4; 123/184.21, 198 E, 123/41.04, 41.05, 41.06, 41.07
See application file for complete search history.

(56) References Cited

U.S. PATENT DOCUMENTS

| | | |
|---|---|---|
| 1,846,283 A | 2/1932 | Summers |
| 1,957,919 A | 5/1934 | Tice |
| 2,197,503 A | 4/1940 | Martin |
| 2,684,204 A | 7/1954 | Lamb |
| 2,881,860 A | 4/1959 | Ternes |
| 2,913,065 A | 11/1959 | Lyon, Jr. |
| 3,696,730 A | 10/1972 | Masuda et al. |
| 3,948,234 A | 4/1976 | Shumaker, Jr. |
| 3,987,862 A | 10/1976 | Lidstone |
| 4,164,262 A | 8/1979 | Skatsche et al. |
| 4,420,057 A | 12/1983 | Omote et al. |
| 4,533,012 A | 8/1985 | Komoda |
| 4,548,166 A | 10/1985 | Gest |
| 4,778,029 A | 10/1988 | Thornburgh |
| 4,878,555 A | 11/1989 | Yasunaga et al. |
| 4,932,490 A | 6/1990 | Dewey |
| 4,971,172 A | 11/1990 | Hoffman et al. |
| 5,022,479 A | 6/1991 | Kiser et al. |

(Continued)

FOREIGN PATENT DOCUMENTS

| | | |
|---|---|---|
| JP | 74133 | 1/1995 |
| JP | 08177658 | 7/1996 |

(Continued)

OTHER PUBLICATIONS

Photo of 2009 Honda Fit (available at http://www.rsportscars.com/honda/2009-honda-fit-sport/pictures/, last visited Sep. 28, 2012).*

(Continued)

*Primary Examiner* — J. Allen Shriver, II
*Assistant Examiner* — Andrew Khouzam
(74) *Attorney, Agent, or Firm* — Rankin, Hill & Clark LLP (57) ABSTRACT

A vehicle air intake system includes a grille disposed along a forward end of a vehicle. The grille has one or more inlet apertures for admitting airflow. A bulkhead extends laterally across the vehicle rearwardly of the grille. An intake enclosure having an intake port is disposed over the bulkhead. A bulkhead cover extends from the bulkhead to the grille. The bulkhead cover has louvers defining airflow passages therebetween for allowing the airflow admitted by the grille to pass to the intake port while inhibiting the passage of particles entrained in the airflow.

21 Claims, 5 Drawing Sheets

U.S. PATENT DOCUMENTS

| | | | |
|---|---|---|---|
| 5,054,567 A | | 10/1991 | Hoffman |
| 5,195,484 A | | 3/1993 | Knapp |
| 5,251,712 A | | 10/1993 | Hayashi et al. |
| 5,269,264 A | * | 12/1993 | Weinhold .................. 123/41.05 |
| 5,417,177 A | | 5/1995 | Taguchi et al. |
| 5,564,513 A | | 10/1996 | Wible et al. |
| 5,660,243 A | | 8/1997 | Anzalone et al. |
| 5,678,884 A | * | 10/1997 | Murkett et al. ............ 296/180.1 |
| 5,794,733 A | | 8/1998 | Stosel et al. |
| 5,860,685 A | | 1/1999 | Horney et al. |
| 5,881,479 A | | 3/1999 | Pavey |
| 6,056,075 A | | 5/2000 | Kargilis |
| 6,059,061 A | | 5/2000 | Economoff et al. |
| D433,656 S | | 11/2000 | Hanagan et al. |
| 6,276,482 B1 | | 8/2001 | Moriya et al. |
| 6,302,228 B1 | * | 10/2001 | Cottereau et al. ............ 180/68.1 |
| 6,405,819 B1 | * | 6/2002 | Ohkura et al. ............... 180/68.1 |
| 6,453,866 B1 | | 9/2002 | Altmann et al. |
| 6,484,835 B1 | | 11/2002 | Krapfl et al. |
| 6,510,832 B2 | | 1/2003 | Maurer et al. |
| 6,564,768 B2 | | 5/2003 | Bauer et al. |
| 6,804,360 B1 | | 10/2004 | Misawa et al. |
| 6,805,088 B2 | | 10/2004 | Tachibana et al. |
| 6,880,655 B2 | * | 4/2005 | Suwa et al. ................. 180/68.1 |
| 7,059,439 B2 | | 6/2006 | Storz et al. |
| 7,234,555 B2 | * | 6/2007 | Khouw et al. ............... 180/68.3 |
| 7,237,635 B2 | * | 7/2007 | Khouw et al. ............... 180/68.3 |
| 7,290,630 B2 | * | 11/2007 | Maeda et al. ............... 180/68.4 |
| 7,350,609 B2 | * | 4/2008 | Udo et al. ................... 180/68.4 |
| 7,686,116 B2 | * | 3/2010 | Oohashi et al. .............. 180/219 |
| 8,127,878 B2 | * | 3/2012 | Teraguchi et al. ............ 180/68.3 |
| 8,157,040 B2 | * | 4/2012 | Khouw et al. ............... 180/68.3 |
| 8,215,433 B2 | * | 7/2012 | Khouw et al. ............... 180/68.3 |
| 2002/0059912 A1 | | 5/2002 | Bauer et al. |
| 2002/0078916 A1 | | 6/2002 | Altmann et al. |
| 2002/0088656 A1 | | 7/2002 | Bergman |
| 2003/0042055 A1 | | 3/2003 | Suwa et al. |
| 2003/0188902 A1 | | 10/2003 | Decuir |
| 2004/0108152 A1 | | 6/2004 | Storz et al. |
| 2004/0231900 A1 | | 11/2004 | Tanaka et al. |
| 2005/0023057 A1 | | 2/2005 | Maeda et al. |
| 2005/0076871 A1 | | 4/2005 | Paek |
| 2005/0230162 A1 | * | 10/2005 | Murayama et al. .......... 180/68.1 |
| 2006/0006011 A1 | | 1/2006 | Khouw et al. |
| 2006/0102109 A1 | * | 5/2006 | Becker et al. .............. 123/41.48 |
| 2010/0170734 A1 | | 7/2010 | Teraguchi et al. |
| 2010/0282533 A1 | * | 11/2010 | Sugiyama ................... 180/68.1 |
| 2012/0048632 A1 | * | 3/2012 | Mehlos et al. ............... 180/68.3 |

FOREIGN PATENT DOCUMENTS

| | | |
|---|---|---|
| JP | 2004190671 | 7/2004 |
| JP | 2005297888 | 10/2005 |
| WO | 0023696 | 4/2000 |

OTHER PUBLICATIONS

International Search Report and Written Opinion for PCT/US12/25473 dated Jun. 19, 2012.
2002 Honda CR-V AWD SE 5DR photographs, pp. 1-9.
Honda Web Parts Catalog—v2.2.2, Apr. 2010 showing intake assembly for 2002 Honda CR-V.
Detroit 2002 Mitsubishi Montero Limited 4wd—Center View photograph.
Detroit 2002 BMW X5—Center View photograph.
2002 Nissan Murano—Center View photograph.
NY 2002 Infiniti G35—Center View photograph.
Frankfurt 1999 Mazda 323 1.5 S Exclusive—Center View photograph.
Detroit 2002 Nissan Altima 2.5 S—Engine Open Door photograph.
Office Action of U.S. Appl. No. 12/816,910 dated Oct. 28, 2010.

* cited by examiner

OVER BULKHEAD AIR INTAKE SYSTEM

BACKGROUND

The present disclosure generally relates to vehicle air intake systems, and more particularly relates to an over bulkhead air intake system having louvers to inhibit the passage of particles entrained in incoming airflow.

Air intake systems provide necessary air to internal combustion engines to aid in the combustion process. Conventional intake systems either draw air from inside the engine compartment or they draw air from outside the vehicle via an exterior intake port. Systems designed where the air is drawn from the inside of the engine compartment commonly suffer a drawback in drawing in warmer and less dense air as compared to exterior air. This can reduce the efficiency of the engine compared with the use of cooler exterior air. A solution to address the shortcomings of these systems is to draw in cooler exterior air. However, systems designed where the air is drawn in via an exterior intake port commonly suffer a drawback of drawing in air that includes water or particles (e.g., snow), which can block the engine intake, inhibit airflow and/or damage the engine.

SUMMARY

According to one aspect, a vehicle air intake system includes a grille disposed along a forward end of a vehicle. The grille has one or more inlet apertures for admitting airflow. A bulkhead extends laterally across the vehicle rearwardly of the grille. An intake enclosure having an intake port is disposed over the bulkhead. A bulkhead cover extends from the bulkhead to the grille. The bulkhead cover has louvers defining airflow passages therebetween for allowing the airflow admitted by the grille to pass to the intake port while inhibiting the passage of particles entrained in the airflow.

According to another aspect, an air intake system for a vehicle includes a grille disposed along a forward end of a vehicle. The grille has one or more inlet apertures for admitting airflow. A bulkhead extends laterally across the vehicle rearwardly of the grille. An intake enclosure having an intake port is disposed over the bulkhead. A bulkhead cover extends from the bulkhead to the grille. The bulkhead cover defines a bulkhead port therethrough for communicating the admitted airflow from the grille to the intake port. A plurality of louvers extend across the bulkhead port.

According to a further aspect, a bulkhead cover for an air intake system of a vehicle includes a forward end connected to an upper portion of a grille and a rearward end connected to a laterally extending bulkhead. A plurality of laterally extending louvers define laterally extending airflow passages therebetween for allowing the airflow admitted by the grille to pass to the intake port while inhibiting the passage of particles entrained in the airflow.

DETAILED DESCRIPTION

Figure 1:
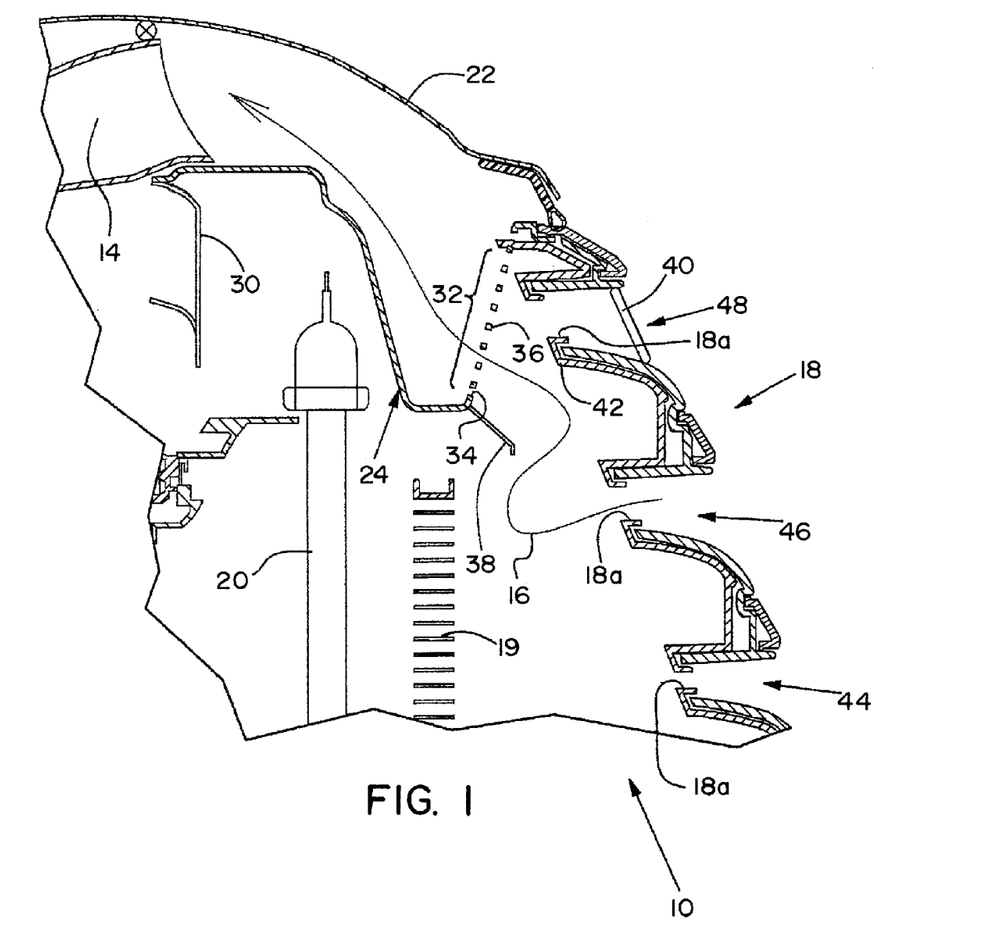
FIG. 1 is a sectional view of a vehicle over bulkhead air intake system.

Referring now to the drawings, wherein the showings are for purposes of illustrating one or more exemplary embodiments and not for purposes of limiting same, FIG. 1 illustrates a known vehicle air intake system for a vehicle, the system generally designated by reference numeral 10. As shown, the system 10 generally includes an air intake tube or enclosure 14 and a flow path 16 to the intake enclosure 14, which can be generally formed by openings 18a through a front fascia or grille 18, a condenser 19, a radiator 20, a front portion 22 of a hood disposed at the front portion of the vehicle and a bulkhead cover 24. The system 10 generally provides cooler air from outside the engine compartment to the vehicle's engine (not shown) while deterring the ingestion of water and/or particles (e.g., snow) contained in the air from being drawn into the air intake enclosure 14. As will be described in more detail below, the bulkhead cover 24 can itself include features for deterring ingestion of water and/or other particles (e.g., snow) as the airflow path 16 is required to pass through the bulkhead cover 24.

Disposed across a front of the engine compartment is a transverse frame element commonly referred to as a bulkhead 30. The bulkhead 30 is generally a structural frame member, such as a U-shaped steel bar or other configuration, that traverses a front region of the engine compartment along a top region of the compartment. The air intake enclosure 14 is disposed above the bulkhead 30 and can be attached directly to the bulkhead, to the bulkhead cover 24 and/or to other structures via hardware such as bolts and/or other common connectors. As is known and understood by those skilled in the art, the air intake enclosure 14 provides an air passageway to an air filter unit (not shown), which further channels filtered air to the vehicle's engine (not shown).

As shown, the bulkhead cover 24 is disposed on top of the bulkhead 30 and can be mounted substantially flat on top of the bulkhead 30. The bulkhead cover 24, which can be formed of plastic, extends forward from the top of the bulkhead 30 to the top of the grille 18. Between the bulkhead 30 and the grille 18, the bulkhead cover 24 can include a forward wall 32 defining a bulkhead cover port 34 for receiving airflow admitted through the grille 18 of the vehicle (i.e., the path 16 passes through the port 34). A screen 36 can be disposed over the bulkhead cover port 34. In the embodiment illustrated in FIG. 1, the forward wall 32 and thus the port 34 and screen 36 face forward and downward at a negative angle relative to a direction of travel of the vehicle. A deflector 38 can be disposed below the bulkhead cover port 34 and can extend forwardly therefrom toward the grille 18. This can advantageously route the airflow path 16 circuitously so as to further inhibit moisture and/or particles from reaching the intake enclosure 14.

The screen 36 of the bulkhead cover 24 forms an air permeable barrier across the flow path 16 for inhibiting moisture droplets and/or relatively large particles (e.g., snow) from entering the air intake enclosure 14 without significantly affecting the flow rate of the incoming air. In particular, the screen 36 can have holes that are small enough to screen out most debris, but not too small to significantly restrict airflow. The moisture droplets and/or particles may be from dust, water, snow or particles splashed or thrown on the front of the vehicle, as well as from moisture or particles carried by intake air received through the grille 18. The screen 36 can provide an initial deflection of these items, which can advantageously prevent the intake system from being clogged. The screen 36 can be integrally formed with the forward wall 32 as is shown in the illustrated embodiment.

The grille 18 can include a blocked portion 40 disposed near the bulkhead cover port 34. More specifically, the grille 18 can include a plurality of airflow inlet recesses 44, 46, 48, which include the apertures 18a. In the illustrated embodiment, the blocked portion 40 extends across an uppermost one of the apertures 18a of the grille 18, which is located directly across from the bulkhead cover port 34. The blocked portion 40 can be a wall disposed across the uppermost recess 48 closing its aperture 18a for preventing airflow from passing therethrough. This prevents airflow from entering the grille 18 and passing straight into the bulkhead cover intake port 34. Instead, the airflow path 16 must pass through one of the lower apertures 18a of the grille 18 and circuitously route to the bulkhead cover port 34, including around the deflector 38.

With reference to FIGS. 2-5, another air intake system for a vehicle is shown according to an alternate embodiment and is generally designated by reference numeral 50. Like the system 10, the system 50 can include a front fascia or grille 52 disposed along a forward end 54 of a vehicle. The grille 52 can have one or more inlet apertures 56 for admitting airflow into an engine compartment 58 of the vehicle. The system 50 can further include a bulkhead 60 extending laterally across the vehicle rearwardly of the grille 52 and an intake tube or enclosure 62 having an intake port 64 disposed over the bulkhead 60. The system 50 additionally includes a bulkhead cover 66 extending from the bulkhead 60 to the grille 52. The bulkhead cover 66 defines a bulkhead port 72 therethrough that allows airflow admitted into the engine compartment 58 through the grille 52 to pass to the intake port 64 of the enclosure 62 (i.e., for communicating the admitted airflow from the grille 52 to the intake port 64 along airflow path 74).

As will be described in more detail below, the bulkhead cover 66 has louvers 68 defining airflow passages 70 therebetween for allowing the airflow admitted by the grille 52 to pass to the intake port 64 while inhibiting the passage of particles entrained in the airflow. In particular, the louvers 68 can be disposed across the bulkhead port 72 to limit or restrict airflow passage therethrough. The louvers 68 can be a plurality of laterally extending louvers 68 that define the airflow passages 70 as laterally extending airflow passages therebetween for allowing the airflow admitted by the grille 52 to pass to the intake port 64 while inhibiting the passage of particles entrained in the airflow from entering the intake port 64. In the illustrated embodiment, the louvers 68 are integrally formed in the bulkhead cover 66 (e.g., both are integrally formed of a plastic material). Though not shown, the bulkhead cover 66 can optionally include longitudinally extending ribs (i.e., extending perpendicular relative to the illustrated louvers 68) for imparting strength to the bulkhead cover 66, particular around the bulkhead port 72.

Figure 2:
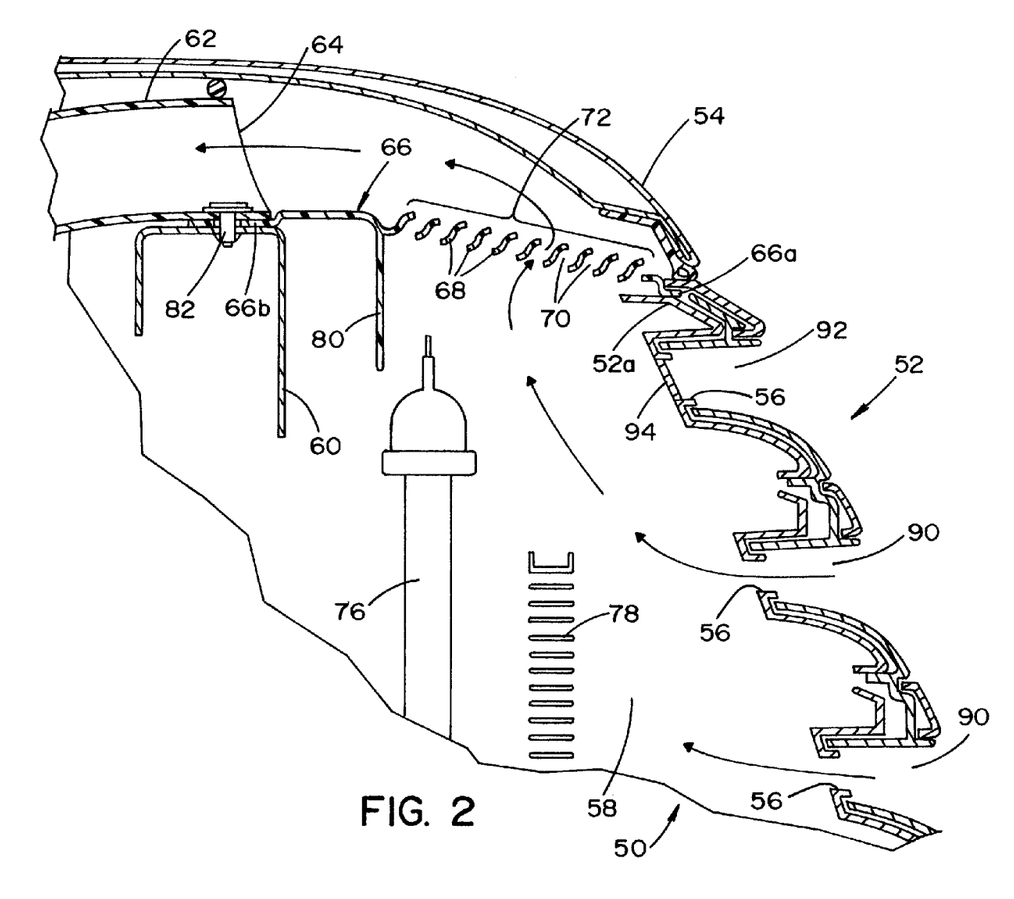
FIG. 2 is a sectional view similar to FIG. 1, but of another vehicle over bulkhead air intake system including a bulkhead cover with louvers.
Figure 3:
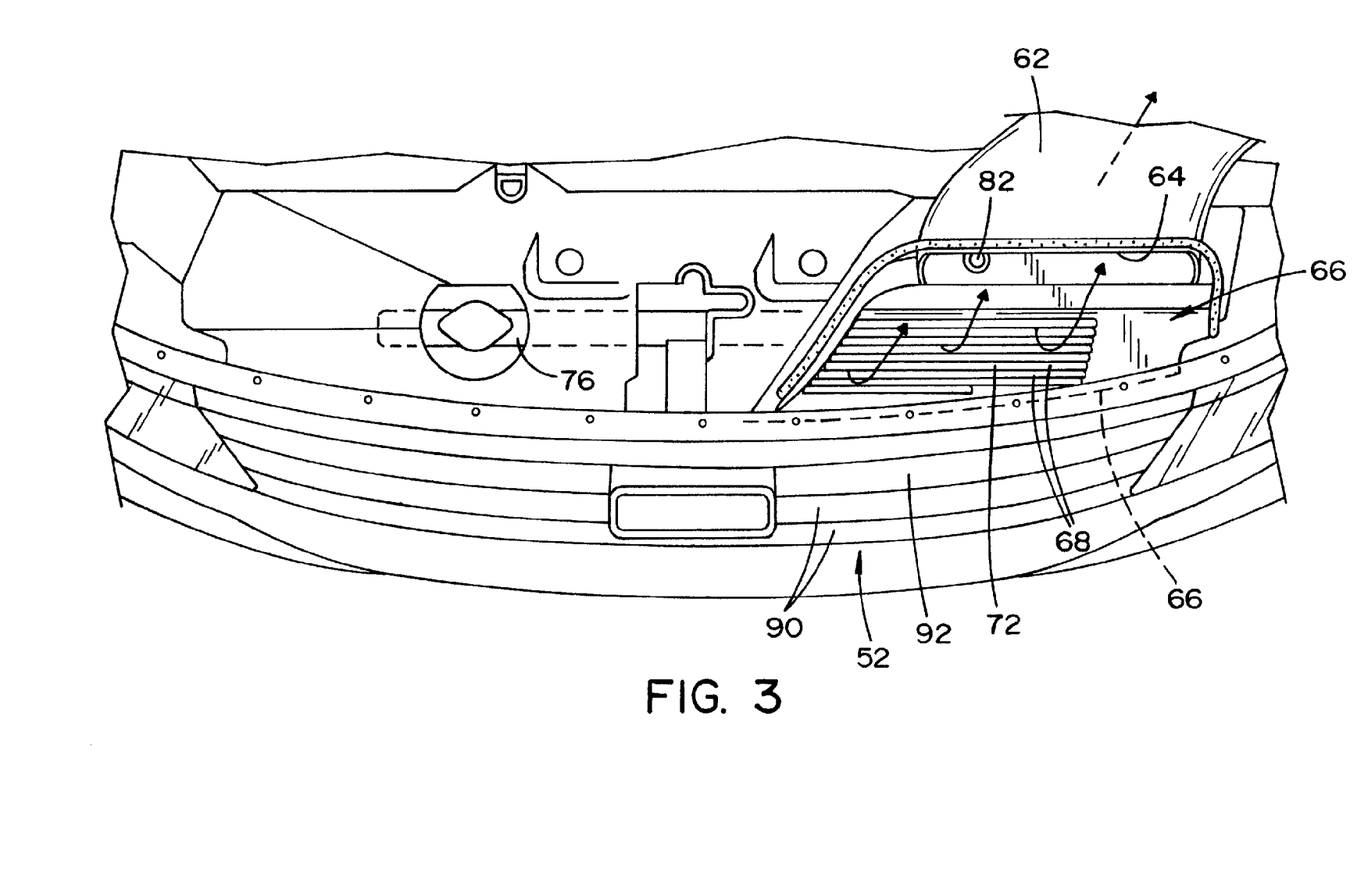
FIG. 3 is a top plan view of the vehicle air intake system of FIG. 2 shown with a hood of the vehicle removed.
Figure 4:
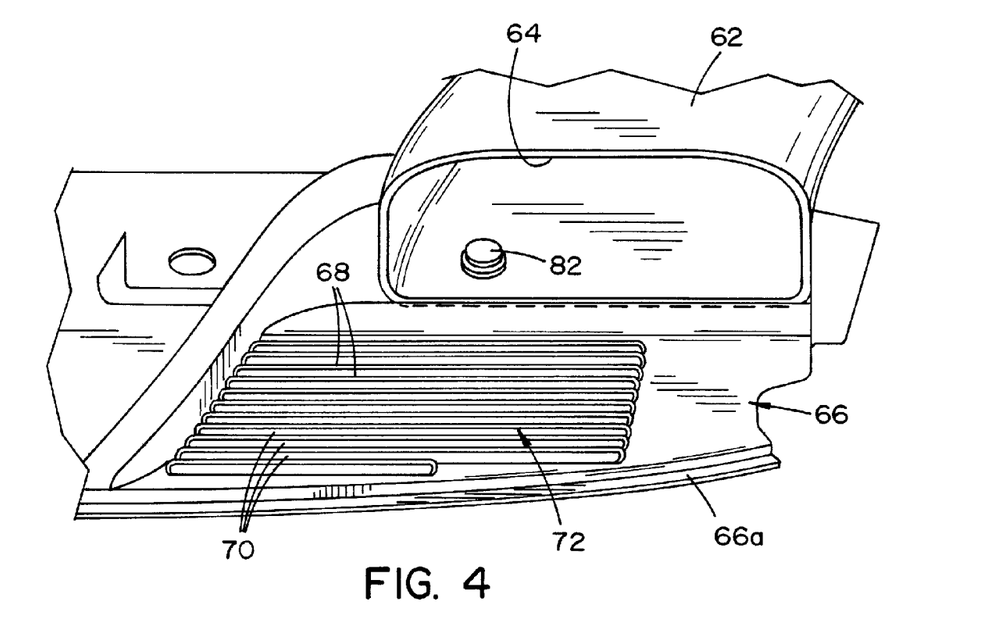
FIG. 4 is a partial perspective view of the bulkhead cover with louvers.

As shown, a radiator 76 can be disposed rearwardly of the grille 52 and below the bulkhead 60. The radiator 76 can receive therethrough a portion of the airflow admitted through the grille 52 (e.g., a majority portion of the airflow for cooling an engine of the vehicle) and redirects a remaining portion of the airflow through the airflow passages 70 defined by the louvers 68 (e.g., a limited amount of remaining airflow). A condenser 78 can be forwardly disposed relative to the radiator 76 as is known and understood by those skilled in the art. Also as shown, the one or more inlet apertures 56 of the grille 52 are spaced vertically below the louvers 68 and the airflow passages 70 defined thereby. Rearward of the louvers 68, the bulkhead cover 66 includes a depending wall 80. In the illustrated embodiment, the depending wall 80 forms an air dam for the airflow admitted by the grille 52. More particularly, the depending wall 80 is longitudinally oriented between the grille 52 and the bulkhead 60 so as to be in approximate alignment with the radiator 76. Together, the radiator 76 and the depending wall 80 form an air dam that redirects at least a portion of the airflow admitted through the grille 52 upward through the airflow passages 70 in the bulkhead cover 66 as defined by the louvers 68.

In the illustrated embodiment, the bulkhead cover 66 includes a forward end 66a connected to an upper portion 52a of the grille 52 and a rearward end 66b connected to the laterally extending bulkhead 60. In particular, in the illustrated construction, the forward end 66a can be formed as a lip that tucks into a groove defined by the upper portion 52a of the grille 52. Alternatively, or in addition, mechanical fasteners could be used to connect the bulkhead cover 66 to the grille 52. The rearward end 66b of the bulkhead cover 66 can be tucked under a lower end of the intake enclosure 62. In the illustrated embodiment, a fastener 82 is used to secure the intake enclosure 62 and the bulkhead cover 66, particularly the rear end 66b thereof, to the bulkhead 60.

The grille 52 of the system 50 includes a plurality of airflow inlet recesses 90, 92. In the illustrated embodiment, the uppermost one 92 of these recesses 90, 92 includes a blocked portion 94 that prevents airflow from passing therethrough. In particular, the upper inlet recess 92 that has the blocked portion 94 is blocked from fluidly communicating with the intake port 64, whereas the lower inlet recess 90 fluidly communicates with the intake port 64 through the airflow passages 70 defined by the louvers 68. In alternate embodiments (not shown), the grille 52 need not include the blocked opening and/or can include any number of openings/passages therethrough (e.g., a single opening or more than two openings).

Figure 5:
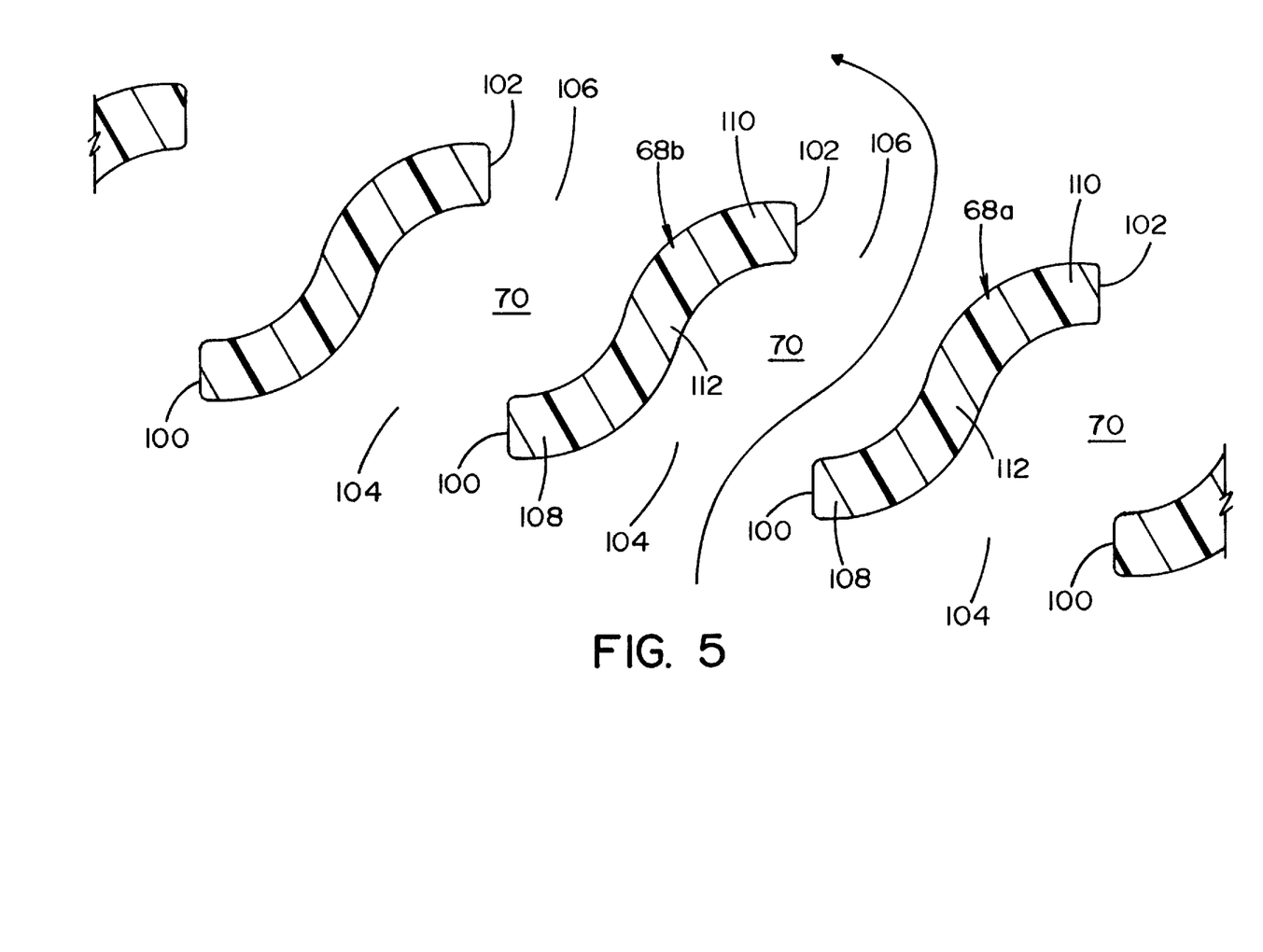
FIG. 5 is a partial enlarged cross-sectional view of the louvers of the bulkhead cover.

With specific reference to FIG. 5, each of the louvers has a rearward end 100 and a forward end 102. The forward end 102 is elevated relative to the rearward end 100. Similarly, each airflow passage 70 has a first end 104 through which airflow from the grille 52 enters and a second end 106 through which airflow exits the airflow passage 70. The second end 106 is elevated relative to the first end 104 and forwardly disposed relative to the first end 104. In one embodiment, the second end 106 is elevated approximately 6 mm relative to the first end 104. By this arrangement, each of the louvers 68 is angled such that the forward end 102 is elevated relative to the rearward end 100 and thereby requires airflow passing through the bulkhead port 72 to be forwardly directed. Accordingly, the louvers 68 force the admitted airflow traveling from the grille 52 to the intake port 64 to be forwardly directed relative to a direction of travel of the vehicle.

In the illustrated embodiment, each of the louvers 68 has a curved configuration extending from the rearward end 100 to the forward end 102. More particularly, each of the louvers 68 has a rearward portion 108 adjacent the rearward end 100, a forward portion 110 adjacent the forward end 102 and an angled portion 112 extending between the rearward portion 108 and the forward portion 110. As shown, a longitudinal orientation of the rearward portion 108 is approximately parallel to a longitudinal orientation of the forward portion 110. More specifically, in the illustrated embodiment, the longitudinal orientations of the rearward and forward portions 108, 110 are approximately parallel to a horizontal longitudinal axis. Also in the illustrated embodiment, the angled portion 112 has a longitudinal orientation of approximately 45 degrees relative to a horizontal longitudinal axis.

As shown, the rearward end 100 of a forwardly disposed one 68a of a pair of adjacent louvers 68a, 68b can be longitudinally aligned with a forward end 102 of a rearwardly disposed one 68b of the pair of adjacent louvers 68a, 68b. In an alternate arrangement, the rearward end 100 of a forwardly disposed one 68a of a pair of adjacent louvers 68a, 68b can be longitudinally overlapped by a forward end 102 of a rearwardly disposed one 68b of the pair of adjacent louvers 68a, 68b.

In operation, airflow enters the grille 52 through the one or more inlet apertures 56 spaced apart vertically below the louvers 68 of the bulkhead port 72. A portion of the airflow admitted through the grille 52 travels through the condenser 78 and the radiator 76. Another portion of the airflow passing through the grille 52 is directed upward along airflow path 74 by at least the radiator 76 and/or the depending wall 80 so as to pass through the bulkhead port 72, in particular through the airflow passages 70 and the louvers 68. The configuration of the louvers 68 can facilitate removal of entrained particles in the airflow passing through the bulkhead port 72 so as to remove those particles form the airflow before the airflow reaches the intake port 64.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle air intake system, comprising:
    a grille disposed along a forward end of a vehicle, the grille having one or more inlet apertures for admitting airflow;
    a bulkhead extending laterally across the vehicle rearwardly of the grille;
    an intake enclosure having an intake port disposed over the bulkhead; and
    a bulkhead cover extending from the bulkhead to the grille, the bulkhead cover having louvers defining airflow passages therebetween for allowing the airflow admitted by the grille to pass to the intake port while inhibiting the passage of particles entrained in the airflow, wherein each of the louvers has a rearward end and a forward end, the forward end of each louver arranged closer to a forward end of the vehicle than the rearward end of each louver and the forward end of each louver elevated relative to the rearward end of each louver.

2. The vehicle air intake system of claim 1 wherein the grille includes at least two inlet recesses including an upper inlet recess that is blocked from fluidly communicating with the intake port and a lower inlet recess that fluidly communicates with the intake port through the airflow passages defined by the louvers.

3. The vehicle air intake system of claim 1 wherein each of the louvers has a curved S-shaped configuration extending from the rearward end of each louver to the forward end of each louver.

4. The vehicle air intake system of claim 1 wherein the louvers are integrally formed in the bulkhead cover.

5. The vehicle air intake system of claim 1 wherein the one or more inlet apertures of the grille are spaced vertically below the louvers.

6. The vehicle air intake system of claim 1 further including a radiator disposed rearwardly of the grille and below the bulkhead, the radiator receiving therethrough a portion of the airflow admitted through the grille and redirecting a remaining portion of the airflow through the airflow passages defined by the louvers.

7. The vehicle air intake system of claim 6 wherein the radiator is disposed forward of the bulkhead.

8. A vehicle air intake system, comprising:
    a grille disposed along a forward end of a vehicle, the grille having one or more inlet apertures for admitting airflow;
    a bulkhead extending laterally across the vehicle rearwardly of the grille;
    an intake enclosure having an intake port disposed over the bulkhead; and
    a bulkhead cover extending from the bulkhead to the grille, the bulkhead cover having louvers defining airflow passages therebetween for allowing the airflow admitted by the grille to pass to the intake port while inhibiting the passage of particles entrained in the airflow, wherein each of the louvers has a rearward end and a forward end, the forward end of each louver arranged closer to a forward end of the vehicle than the rearward end of each louver and the forward end of each louver elevated relative to the rearward end of each louver, and wherein each of the louvers has a rearward portion adjacent the rearward end of each louver, a forward portion adjacent the forward end of each louver and an angled portion extending between the rearward portion and the forward portion, a longitudinal orientation of the rearward portion approximately parallel to a longitudinal orientation of the forward portion.

9. The vehicle air intake system of claim 8 wherein the longitudinal orientations of the rearward and forward portions are approximately parallel to a horizontal longitudinal axis.

10. The vehicle air intake system of claim 8 wherein the angled portion has a longitudinal orientation of approximately forty five degrees relative to a horizontal longitudinal axis.

11. The air intake system of claim 8 wherein each of the louvers has a curved configuration extending from the rearward end of each louver to the forward end of each louver.

12. A vehicle air intake system, comprising:
    a grille disposed along a forward end of a vehicle, the grille having one or more inlet apertures for admitting airflow;
    a bulkhead extending laterally across the vehicle rearwardly of the grille;
    an intake enclosure having an intake port disposed over the bulkhead; and
    a bulkhead cover extending from the bulkhead to the grille, the bulkhead cover having louvers defining airflow passages therebetween for allowing the airflow admitted by the grille to pass to the intake port while inhibiting the passage of particles entrained in the airflow, wherein each of the louvers has a rearward end and a forward end, the forward end of each louver arranged closer to a forward end of the vehicle than the rearward end of each louver and the forward end of each louver elevated relative to the rearward end of each louver, and wherein the rearward end of a forwardly disposed one of a pair of adjacent louvers is longitudinally aligned with a forward end of a rearwardly disposed one of the pair of adjacent louvers.

13. A vehicle air intake system, comprising:
    a grille disposed along a forward end of a vehicle, the grille having one or more inlet apertures for admitting airflow;
    a bulkhead extending laterally across the vehicle rearwardly of the grille;
    an intake enclosure having an intake port disposed over the bulkhead; and
    a bulkhead cover extending from the bulkhead to the grille, the bulkhead cover having louvers defining airflow passages therebetween for allowing the airflow admitted by the grille to pass to the intake port while inhibiting the passage of particles entrained in the airflow, wherein each of the louvers has a rearward end and a forward end, the forward end of each louver arranged closer to a forward end of the vehicle than the rearward end of each louver and the forward end of each louver elevated relative to the rearward end of each louver, and wherein the rearward end of a forwardly disposed one of a pair of adjacent louvers is longitudinally overlapped by a forward end of a rearwardly disposed one of the pair of adjacent louvers.

14. A vehicle air intake system, comprising:
a grille disposed along a forward end of a vehicle, the grille having one or more inlet apertures for admitting airflow;
a bulkhead extending laterally across the vehicle rearwardly of the grille;
an intake enclosure having an intake port disposed over the bulkhead; and
a bulkhead cover extending from the bulkhead to the grille, the bulkhead cover having louvers defining airflow passages therebetween for allowing the airflow admitted by the grille to pass to the intake port while inhibiting the passage of particles entrained in the airflow; and
a radiator disposed rearwardly of the grille and below the bulkhead, the radiator receiving therethrough a portion of the airflow admitted through the grille and redirecting a remaining portion of the airflow through the airflow passages defined by the louvers, wherein the bulkhead cover includes a depending wall forming an air dam together with the radiator for the airflow admitted through the grille, the depending wall extending to a location spaced below the louvers and together with the radiator directing airflow from the grill to the louvers.

15. The vehicle air intake system of claim 14 wherein the depending wall is longitudinally oriented in approximate alignment with the radiator.

16. The vehicle air intake system of claim 14 wherein each airflow passage has a first end through which airflow from the grille enters and a second end through which airflow exits the airflow passage, the second end is elevated relative to the first end and forwardly disposed relative to the first end.

17. The vehicle air intake system of claim 15 wherein the second end is elevated approximately 6 mm relative to the first end.

18. An air intake system for a vehicle, comprising:
a grille disposed along a forward end of a vehicle, the grille having one or more inlet apertures for admitting airflow;
a bulkhead extending laterally across the vehicle rearwardly of the grille;
an intake enclosure having an intake port disposed over the bulkhead;
a bulkhead cover extending from the bulkhead to the grille, the bulkhead cover defining a bulkhead port therethrough for communicating the admitted airflow from the grille to the intake port; and
a plurality of louvers extending across the bulkhead port, wherein each of the louvers is angled such that a forward end of each louver is elevated relative to a rearward end of each louver and thereby requires airflow passing through the bulkhead port to be forwardly directed.

19. The air intake system of claim 18 wherein the louvers force the admitted airflow traveling from the grille to the intake port to be forwardly directed relative to a direction of travel of the vehicle.

20. The air intake system of claim 18 wherein the plurality of louvers are S-shaped and laterally extending to define laterally extending airflow passages therebetween for allowing the airflow admitted by the grille to pass to the intake port while inhibiting the passage of particles entrained in the airflow.

21. The air intake system of claim 18 wherein the plurality of louvers define airflow passages that extend unbroken from one lateral side of the bulkhead port to another opposite lateral side of the bulkhead port.

* * * * *